(12) United States Patent
Pappalardo

(10) Patent No.: US 7,635,143 B2
(45) Date of Patent: Dec. 22, 2009

(54) SYSTEM AND METHOD FOR PROTECTING A TRAILER COUPLER

(75) Inventor: Adam J. Pappalardo, P.O. Box 598, Atkinson, NH (US) 03811

(73) Assignee: Adam J. Pappalardo, Atkinson, NH (US)

(*) Notice: Subject to any disclaimer, the term of this patent is extended or adjusted under 35 U.S.C. 154(b) by 234 days.

(21) Appl. No.: 11/749,185

(22) Filed: May 16, 2007

(65) Prior Publication Data
US 2008/0284135 A1 Nov. 20, 2008

(51) Int. Cl.
*B60D 1/60* (2006.01)
(52) U.S. Cl. .................................................. 280/507
(58) Field of Classification Search ................... 280/507
See application file for complete search history.

(56) References Cited

U.S. PATENT DOCUMENTS

| | | | |
|---|---|---|---|
| 3,605,457 A | 9/1971 | Foster | |
| 4,538,827 A | 9/1985 | Plifka | |
| 5,421,601 A * | 6/1995 | Hinze et al. | 280/507 |
| 5,681,053 A | 10/1997 | Misukanis et al. | |
| 5,775,139 A | 7/1998 | Sellers | |
| 5,794,961 A | 8/1998 | Niswanger | |
| 6,070,441 A | 6/2000 | Bernstrom | |
| 6,244,614 B1 | 6/2001 | Bonvillain et al. | |
| 6,412,313 B1 | 7/2002 | Bernstrom | |
| 6,412,806 B1 * | 7/2002 | Peacock | 280/507 |
| 6,434,982 B1 * | 8/2002 | Rowland | 70/211 |
| 6,588,239 B1 | 7/2003 | Johansson | |
| 6,598,432 B1 | 7/2003 | Dwyer | |
| 6,698,256 B2 | 3/2004 | Witchey | |
| 6,862,904 B1 | 3/2005 | Hubbart | |
| 6,976,695 B1 | 12/2005 | Smith, III | |
| 7,246,810 B2 * | 7/2007 | Bussiere et al. | 280/507 |
| 2001/0023601 A1 | 9/2001 | Gilbertson et al. | |
| 2002/0136600 A1 | 9/2002 | Thompson et al. | |
| 2003/0167806 A1 | 9/2003 | Witchey | |

* cited by examiner

*Primary Examiner*—Kevin Hurley
(74) *Attorney, Agent, or Firm*—Sheehan Phinney Bass & Green P.A.; Peter A. Nieves

(57) ABSTRACT

A system for protecting a trailer coupler contains a first arm rotatably connected to a second arm. The first arm contains a top portion, a side portion, and a bottom portion, the top portion of the first arm containing a first opening. The second arm contains a top portion, a side portion, and a bottom portion, wherein the top portion of the second arm contains a first opening. The trailer coupler fits within the system and aligning the said first opening of the first arm and the first opening of the second arm forms a system top portion opening that allows access to a hitch of the trailer coupler while not allowing access to other top portions of the trailer coupler or side portions of the trailer coupler.

12 Claims, 7 Drawing Sheets

SYSTEM AND METHOD FOR PROTECTING A TRAILER COUPLER

FIELD OF THE INVENTION

The present invention is generally related to locking devices, and more particularly is related to a device for preventing access to a trailer coupler.

BACKGROUND OF THE INVENTION

As is well known, trailers provide the capability of towing different items from a first location to a second location. One classification of trailer contains a trailer coupler that is capable of receiving a trailer ball. Specifically, the back of a vehicle contains a receiver assembly located on a trailer hitch, where the receiver assembly has a ball mount connected thereto. In turn, the ball mount has a hitch ball connected thereto. A ball-type trailer coupler contains a ball socket for receiving the hitch ball.

Unfortunately, theft of trailers by unauthorized connecting to the trailer coupler is common. To remove the trailer, an unauthorized party inserts a hitch ball located on their vehicle, into a ball socket of trailer coupler. After this connection, and any other securing, the trailer may be taken by the unauthorized individual, in addition to any items located thereon.

FIG. 1 is a schematic diagram illustrating an example of a commonly used ball-type trailer coupler 100. The trailer coupler 100 is removably connected to an end of a tongue 150 of a trailer (not shown) by at least one coupler bolt 110, where the bolt 110 travels into a portion of the trailer coupler 100, through the tongue 150, and out of the coupler 100. The trailer coupler 100 also contains a hitch 102, the lifting of which opens access to a ball socket 104 that is capable of receiving a hitch ball. In addition, the trailer coupler 100 contains a flange 120.

To prevent access to the ball socket 104, hitch locks are typically used to secure the hitch 102 in place. A hitch lock (not shown) is connected to a hitch opening 106, and secured thereto, thereby preventing lifting of the hitch 102 and opening access to the ball socket 104.

Unfortunately, while access to the ball socket 104 of the trailer coupler 100 is prevented through use of a lock that is connected to the hitch 102 to prevent lifting of the hitch 102, a trailer may still be stolen by unauthorized removal of the coupler bolt 110 from the tongue 150 of the trailer. Such removal allows the trailer coupler 100 to be removed from the tongue 150 of the trailer. With the trailer coupler 100 removed, a new trailer coupler may be attached to the tongue 150 of the trailer, a hitch ball connected thereto, and the trailer taken.

Thus, a heretofore unaddressed need exists in the industry to address the aforementioned deficiencies and inadequacies.

SUMMARY OF THE INVENTION

Embodiments of the present invention provide a system and method for protecting a trailer coupler. Briefly described, in architecture, one embodiment of the system, among others, can be implemented as follows. The system for protecting a trailer coupler contains a first arm rotatably connected to a second arm. The first arm contains a top portion, a side portion, and a bottom portion, the top portion of the first arm containing a first opening. The second arm contains a top portion, a side portion, and a bottom portion, wherein the top portion of the second arm contains a first opening. The trailer coupler fits within the system and aligning the said first opening of the first arm and the first opening of the second arm forms a system top portion opening that allows access to a hitch of the trailer coupler while not allowing access to other top portions of the trailer coupler or side portions of the trailer coupler.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present system is a shell that is capable of preventing removal of a trailer coupler from a tongue of a trailer by preventing access to a coupler bolt that removably connects the trailer coupler to the tongue of the trailer. With use of the present system, a user can still access a hitch of the coupler, however, access to a ball socket of the coupler is also prevented. Interaction of the present system with a trailer coupler is described in detail herein.

Figure 1:
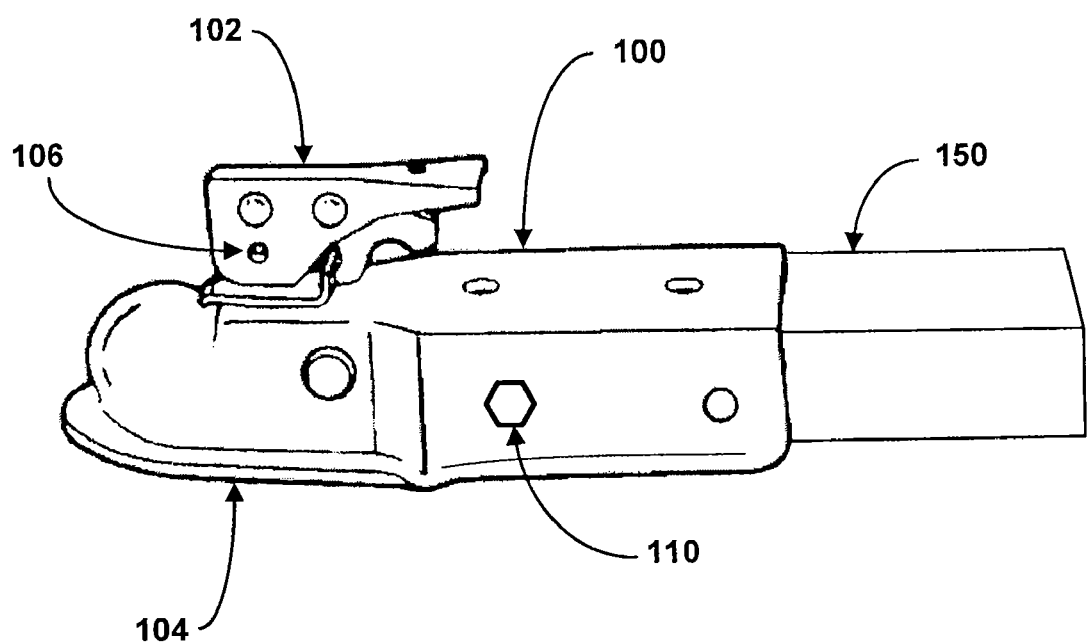
FIG. 1 is a schematic diagram illustrating an example of a commonly used ball-type trailer coupler, in accordance with the prior art.
Figure 2:
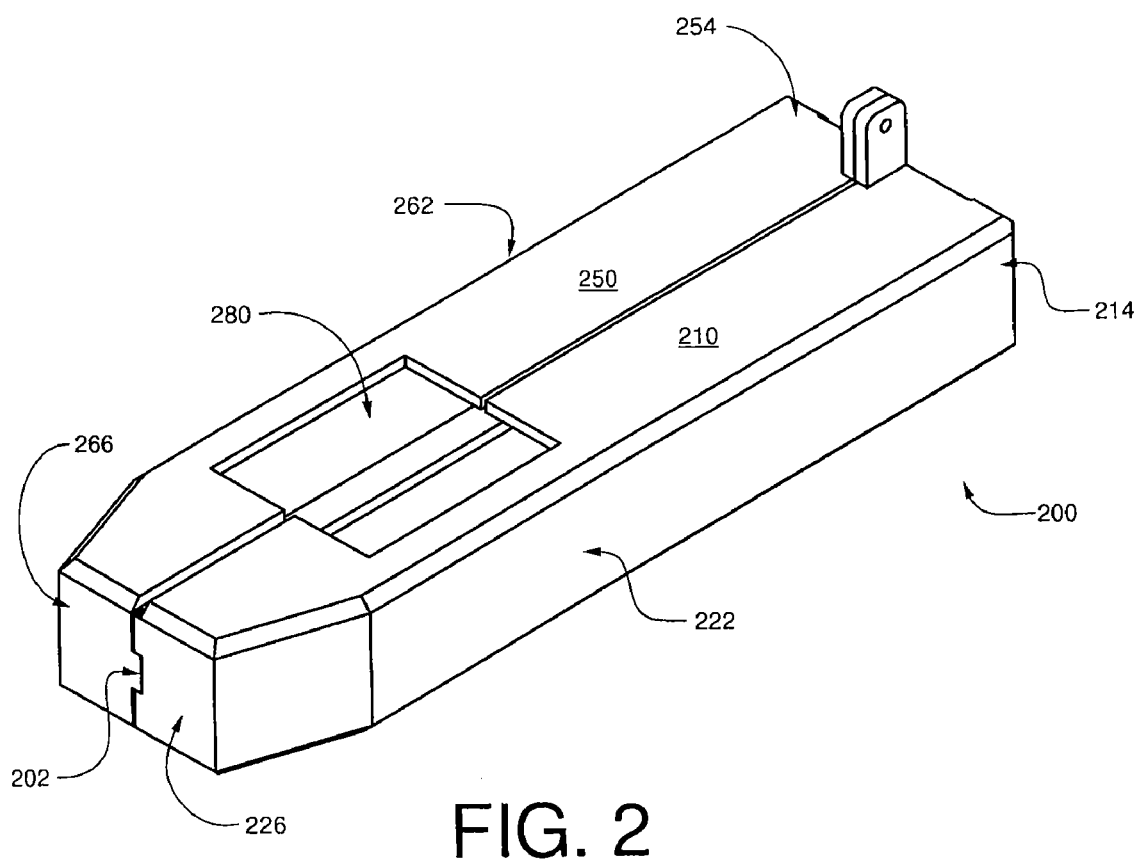
FIG. 2 is a back top perspective view of the present system in a closed state, in accordance with a first exemplary embodiment of the invention.
Figure 3:
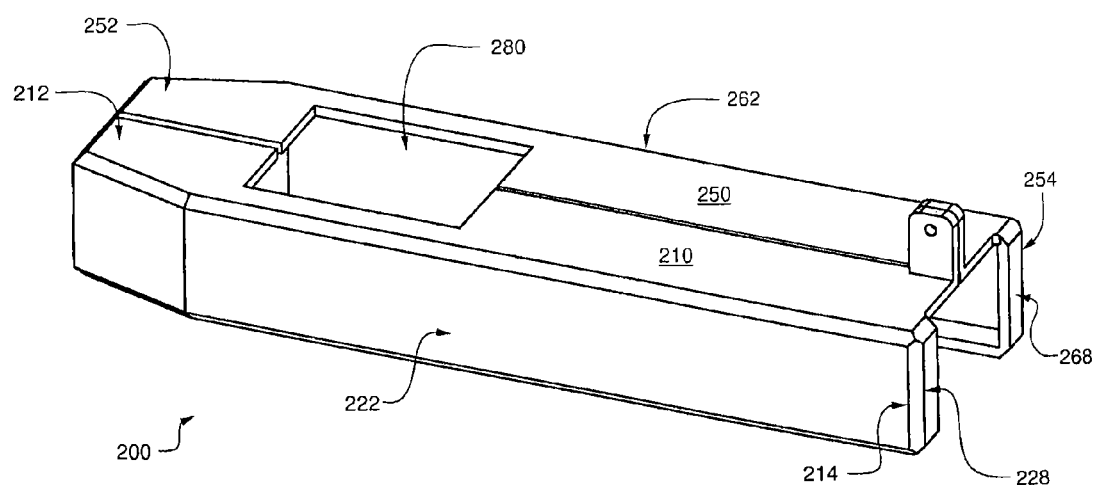
FIG. 3 is a front top perspective view of the system of FIG. 1, also in a closed state.
Figure 4:
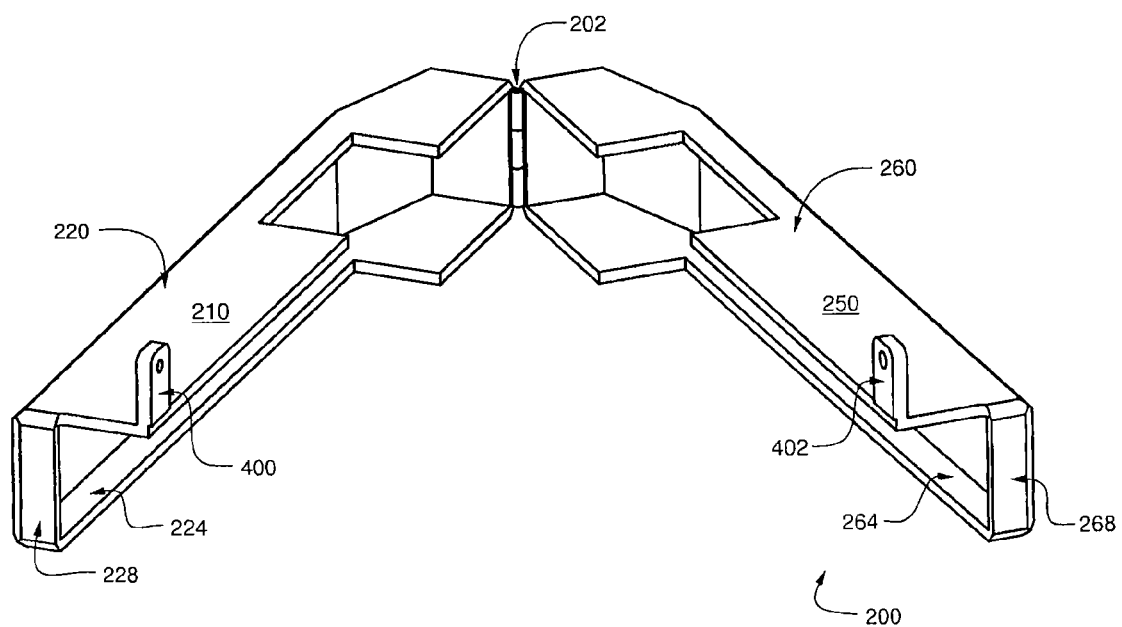
FIG. 4 is a front top perspective view of the system of FIG. 1, in an open state.
Figure 5:
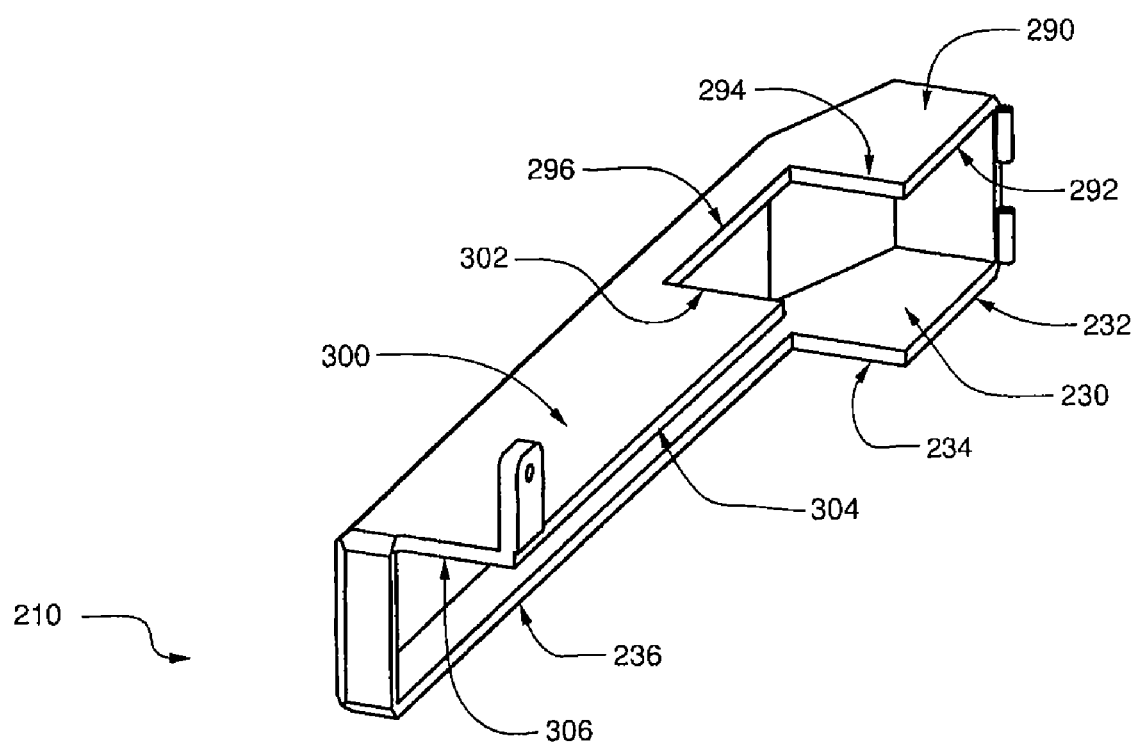
FIG. 5 is a front top perspective view of a first arm of the system of FIG. 1
Figure 6:
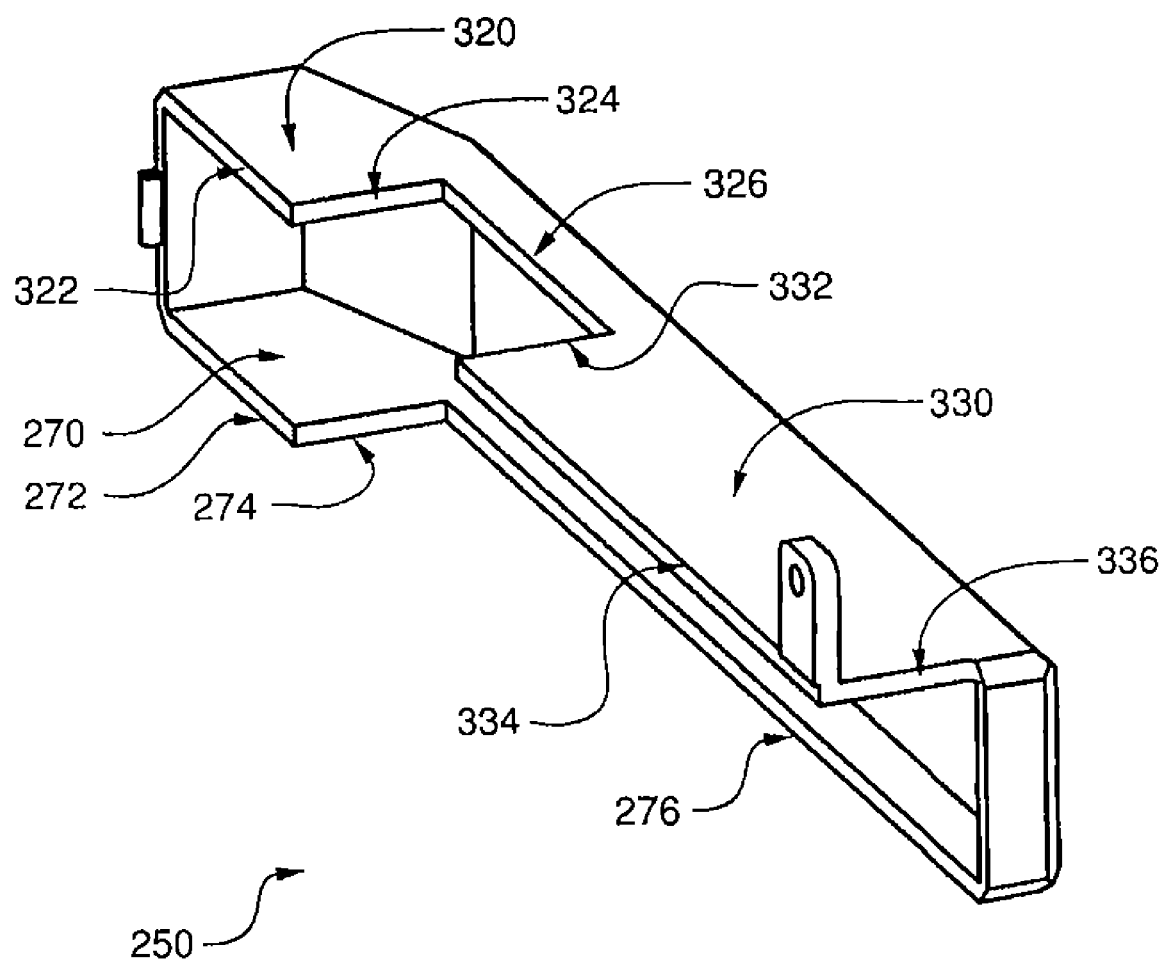
FIG. 6 is a front top perspective view of a second arm of the system of FIG. 1.
Figure 7:
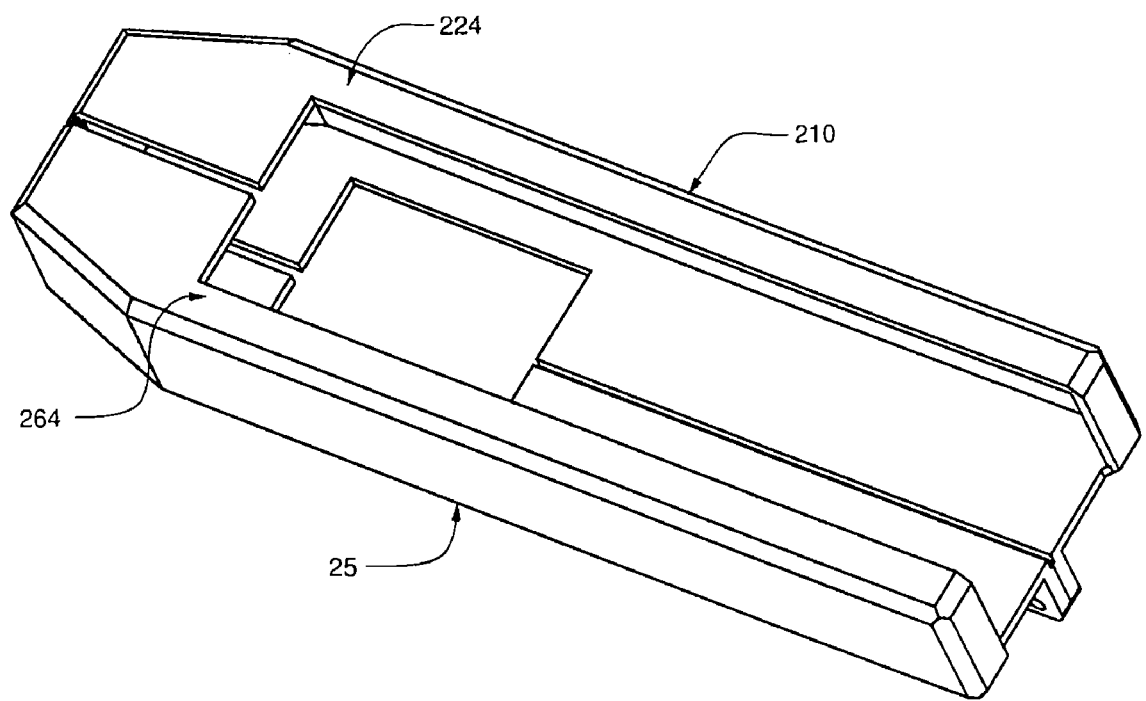
FIG. 7 is a front bottom perspective view of the system of FIG. 1.

FIG. 2 is a back top perspective view of the present system 200 in a closed state, in accordance with a first exemplary embodiment of the invention. In addition, FIG. 3 is a front top perspective view of the system 200 of FIG. 1, also in a closed state. Further, FIG. 4 is a front top perspective view of the system 200 of FIG. 1, but instead in an open state, while FIG. 5 is a front top perspective view of a first arm of the system 200 and FIG. 6 is a front top perspective view of a second arm of the system 200. Still further, FIG. 7 is a front bottom perspective view of the system 200 of FIG. 1. It should be noted that the shapes provided by FIGS. 2-7 are provided for exemplary purposes. One having ordinary skill in the art would appreciate that alternative shapes may be used in accordance with the present invention, and such shapes are intended to be covered by the present disclosure. As an example, the present system 200 is shown as being beveled, although the system 200 may instead not be beveled. In addition, outer sides of the system 200 may instead be a different shape, as long as a trailer coupler is capable of being secured therein, as described in detail below.

Referring to FIGS. 2-7, the system 200 contains a first arm 210 and a second arm 250. The first arm 210 is rotatably connected to the second arm 250 via a hinge 202. While FIG. 2 illustrates an outside portion of the hinge 202, FIG. 4 illustrates the hinge 202 from inside of the system 200. It should be noted that the hinge 202 may be any known hinge that is capable of joining two portions, while also providing rotational capability. Preferably, the hinge 202 is also strong enough to prevent tampering with the hinge 202 or removal of the hinge 202. The hinge 202 is connected to a distal portion 212 of the first arm 210 and a distal portion 252 of the second arm 250, thereby allowing the system 200 to open and close by separating and closing distance between a proximate portion 214 of the first arm 210 and a proximate portion 254 of the second arm 250. Specifically, the hinge 202 acts as an axis of rotation for the system 200.

The first arm 210 of the system 200 contains a top portion 220, a side portion 222, a bottom portion 224, a back portion 226, and a front portion 228. The first arm 210 is concave in shape, where the top portion 220, the side portion 222, the bottom portion 224, the back portion 226, and the front portion 228 define the concave shape. Likewise, the second arm 250 of the system 200 contains a top portion 260, a side portion 262, a bottom portion 264, a back portion 266, and a front portion 268. The second arm 250 is concave in shape, where the top portion 260, the side portion 262, the bottom portion 264, the back portion 266, and the front portion 268 define the concave shape. As is explained in more detail below, the concave shape of the first arm 210 and the concave shape of the second arm 250 allows the first arm 210 and the second arm 250 to be closed around a trailer coupler 100 (FIG. 1), such as the trailer coupler 100 of FIG. 1.

The purpose of the bottom portion 224 of the first arm 210 and the bottom portion 264 of the second arm 250, and the shape of each bottom portion 224, 264 is to prevent access to a ball socket 104 (FIG. 1) of a trailer coupler 100 (FIG. 1) when the system 200 is in a closed state around the trailer coupler 100 (FIG. 1), while providing ample spacing for running items such as, but not limited to, wiring. Specifically, starting from the distal portion 212 of the first arm 210, the bottom portion 224, which extends in a plane perpendicular to a plane of the side portion 222, contains a step 230 having a top surface 232 and a side surface 234, where a plane of the side surface 234 extends perpendicular to a plane of the top surface 232. A bottom surface 236 of the first arm step 230 extends in a plane perpendicular to the plane of the side surface 234.

Similar to the first arm 210, starting from the distal portion 252 of the second arm 250, the bottom portion 264, which extends in a plane perpendicular to a plane of the side portion 262, contains a step 270 having a top surface 272 and a side surface 274, where a plane of the side surface 274 extends perpendicular to a plane of the top surface 272. A bottom surface 276 of the second arm step 270 extends in a plane perpendicular to the plane of the side surface 274.

The front portion 228 of the first arm 210 extends inward from the side portion 222 of the first arm 210 in a direction perpendicular to a plane of the side portion 222 of the first arm 210. A first lip is created by the front portion 228 of the first arm 210. In addition, the front portion 268 of the second arm 250 extends inward from the side portion 262 of the second arm 250 in a direction perpendicular to a plane of the side portion 262 of the second arm 250. A second lip is created by the front portion 268 of the second arm 250.

When the system 200 is in the closed condition, as shown by FIG. 2, FIG. 3, FIG. 5, FIG. 6, and FIG. 7, the first and second lips of the system 100 prevent a trailer coupler 100 (FIG. 1) from being removed from a trailer tongue 150 (FIG. 1). Specifically, the system 200 is fabricated to be slightly longer than the trailer coupler 100 (FIG. 1). As a result, when the system 200 is closed around the trailer coupler 100 (FIG. 1), the first and second lips of the system 200 surround an outer flange 120 (FIG. 1) of the trailer coupler 100 (FIG. 1).

The purpose of the top portion 220 of the first arm 210 and the top portion 260 of the second arm 250, and the shape of each top portion 220, 260 is to prevent access to the trailer coupler 100 (FIG. 1) from either the top or the side, while allowing access to the hitch 102 (FIG. 1) of the trailer coupler 100 (FIG. 1). Specifically, since the top portion 220 of the first arm 210 and the top portion 260 of the second arm 250 are brought together, except for at a top portion opening 280 that allows access to the hitch 102 (FIG. 1), access is not provided to the coupler bolt 110 (FIG. 1). As previously mentioned, the coupler bolt 110 provides a connection from the trailer coupler 100 (FIG. 1) to the tongue 150 (FIG. 1) of the trailer. By preventing access to the coupler bolt 110 (FIG. 1), the trailer coupler 100 (FIG. 1) cannot be removed from the tongue 150 (FIG. 1) of the trailer.

Beginning from the distal portion 212 of the first arm 210, the top portion 220, which extends in a plane perpendicular to a plane of the side portion 222, contains a first step 290 having a top surface 292 and a side surface 294, where a plane of the side surface 294 extends perpendicular to a plane of the top surface 292. An end of the side surface 294 that is opposite the top surface 292 meets a central surface 296, which is located between the first step 290 and a second step 300. The second step 300 contains a first side surface 302 and a top surface 304, where a plane of the top surface 304 extends perpendicular to a plane of the first side surface 302, and where the plane of the top surface 304 of the second step 300 is parallel to the plane of the top surface 292 of the first step 290. An end of the top surface 304 of the second step 300 that is opposite the first side surface 302 meets a second side surface 306, where a plane of the second side surface 306 is perpendicular to the plane of the top surface 304 of the second step 300. It should be noted that the first step 290 side surface 294, the central surface 296, and the second step 300 first side surface 302 may be referred to together as a first arm 210 opening.

Similar to the first arm 210, beginning from the distal portion 252 of the second arm 250, the top portion 260, which extends in a plane perpendicular to a plane of the side portion 262, contains a first step 320 having a top surface 322 and a side surface 324, where a plane of the side surface 324 extends perpendicular to a plane of the top surface 322. An end of the side surface 324 that is opposite the top surface 322 meets a central surface 326, which is located between the first step 320 and a second step 330. The second step 330 contains a first side surface 332 and a top surface 334, where a plane of the top surface 334 extends perpendicular to a plane of the first side surface 332, and where the plane of the top surface 334 of the second step 330 is parallel to the plane of the top surface 322 of the first step 320. An end of the top surface 334 of the second step 330 that is opposite the first side surface 332 meets a second side surface 336, where a plane of the second side surface 336 is perpendicular to the plane of the top surface 334 of the second step 330. It should be noted that the first step 320 side surface 324, the central surface 326, and the second step 330 first side surface 332 may be referred to together as a second arm 250 opening.

When the system 200 is in the closed position, the top surface 292 of the first step 290 located on the first arm 210 is aligned parallel to the top surface 322 of the first step 320 located on the second arm 250. In addition, the top surface 304 of the second step 300 located on the first arm 210 is aligned parallel to the top surface 334 of the second step 330 located on the second arm 250. The result of these alignments is top access to the trailer coupler 100 once positioned within the system 100 being limited to access through the top portion opening 280, and even then, limited to access for the hitch 102 (FIG. 1).

The first arm 210 and the second arm 250 of the system 200 are preferably removably secured together to prevent removal of the system 200 from the trailer coupler 100 (FIG. 1). To maintain location of the first arm 210 adjacent the second arm 250 when the system 200 is in the closed state, a tab located on the top portion 220 of the first arm 210 is removably secured to a tab located on the top portion 260 of the second arm 250. Specifically, a first tab 400 extends from the top portion 220 of the first arm 210 in an axis perpendicular to a plane of the top portion 220 of the first arm 210. In addition, a second tab 402 extends from the top portion 260 of the second arm 250 in an axis perpendicular to a plane of the top portion 260 of the second arm 250. Each of the tabs 400, 402 contains a hole for allowing a lock to be secured thereto. By securing and locking the lock to the holes of the tabs 400, 402, the first arm 210 is prevented from being separated from the second arm 250, thereby maintaining the system 200 to the trailer coupler 100 (FIG. 1).

The system 200 may be fabricated from one or more material such as, but not limited to, metal, or plastic. It should be noted, however, that it is preferable that the system 200 be fabricated from a material that is strong enough to prevent effective tampering with the system 200 that would otherwise remove the system 200 from a trailer coupler.

As mentioned above, in accordance with alternative embodiments of the invention, the system 200 may be shaped differently. As an example, the bottom portion 224 of the first arm 210 and the bottom portion 264 of the second arm 250 may be shaped differently, as long as access to the ball socket 104 (FIG. 1) of a trailer coupler 100 (FIG. 1) is prevented so that a hitch ball cannot be placed within the ball socket 104 (FIG. 1). As another example, the top portion 220 of the first arm 210 and the top portion 260 of the second arm 250 may be shaped differently, as long as the hitch 102 (FIG. 1) of the trailer coupler 100 is accessible and the coupler bolt 110 (FIG. 1) is not accessible. Further, the side portions 222, 262 of the system may have a different size.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A system for protecting a trailer coupler, comprising:
    a first arm containing a top portion, a side portion, and a bottom portion, said top portion of said first arm containing a first opening; and
    a second arm containing a top portion, a side portion, and a bottom portion, said second arm being rotatably connected to said first arm, wherein said top portion of said second arm contains a first opening;
    wherein, said trailer coupler fits within said system and wherein aligning said first opening of said first arm and said first opening of said second arm forms a system top portion opening that allows access to a hitch of said trailer coupler while not allowing access to other top portions of said trailer coupler or side portions of said trailer coupler, and
    wherein said bottom portion of said first arm contains a step and wherein said bottom portion of said second arm contains a step, aligning of said step of said first arm adjacent said step of said second step resulting is preventing access to a ball socket of said trailer coupler.

2. The system of claim 1, wherein said first arm is rotatably connected to said second arm by a hinge.

3. The system of claim 1, wherein said first arm further comprises a tag extending from said top portion of said first arm, and wherein said second arm further comprises a tag extending from said top portion of said second arm, said tag of said first arm being capable of being locked in a position adjacent said tag of said second arm.

4. The system of claim 1, wherein said first arm further comprises a front portion and wherein said second arm further comprises a front portion, wherein said front portion of said first arm and said front portion of said second arm prevent said system from sliding off of said trailer coupler when said first arm is connected to said second arm.

5. The system of claim 1, wherein said system is fabricated from a material selected from the group consisting of metal and plastic.

6. The system of claim 1, wherein joining said first arm and said second arm results in a bottom opening being located between said bottom portion of said first arm and said bottom portion of said second arm.

7. The system of claim 1, wherein said first arm may be removed from said second arm.

8. The system of claim 1, further comprising means for rotatably connecting said first arm to said second arm.

9. The system of claim 4, wherein said first arm is concave is shape and wherein said second arm is concave in shape.

10. The system of claim 1, further comprising means for removably connecting said first arm to said second arm.

11. The system of claim 1, wherein said first arm contains a proximate portion and a distal portion, and wherein said second arm contains a proximate portion and a distal portion, said system containing means for rotatably connected said first arm to said second arm joining said distal portion of said first arm to said distal portion of said second arm.

12. The system of claim 11, further comprising means for removably connecting said proximate portion of said first arm to said proximate portion of said second arm.

* * * * *